United States Patent
Branca et al.

(10) Patent No.: US 8,947,059 B2
(45) Date of Patent: Feb. 3, 2015

(54) SYMMETRICAL OUTPUT SWITCH-MODE POWER SUPPLY

(75) Inventors: Xavier Branca, Grenoble (FR); David Chesneau, Saint Jean de Moirans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 171 days.

(21) Appl. No.: 13/820,596

(22) PCT Filed: Sep. 9, 2011

(86) PCT No.: PCT/EP2011/065693
§ 371 (c)(1),
(2), (4) Date: Mar. 4, 2013

(87) PCT Pub. No.: WO2012/032177
PCT Pub. Date: Mar. 15, 2012

(65) Prior Publication Data
US 2013/0154591 A1    Jun. 20, 2013

Related U.S. Application Data

(60) Provisional application No. 61/390,226, filed on Oct. 6, 2010.

(30) Foreign Application Priority Data

Sep. 10, 2010    (FR) ..................................... 10 57234

(51) Int. Cl.
*G05F 1/10*       (2006.01)
*G05F 1/56*       (2006.01)
(Continued)

(52) U.S. Cl.
CPC ................ *G05F 1/56* (2013.01); *H02M 3/158* (2013.01); *H02M 2001/009* (2013.01)
USPC ......................................... 323/271; 323/282

(58) Field of Classification Search
CPC ........................................................ G05F 1/56
USPC .......................... 323/266, 268, 271, 282, 285
See application file for complete search history.

(56) References Cited

U.S. PATENT DOCUMENTS 7,728,652 B2 *   6/2010   Sohara et al. ................. 327/536
8,044,645 B2 *   10/2011   Zambetti et al. ............. 323/272
(Continued)

FOREIGN PATENT DOCUMENTS

GB          2 415 099 A     12/2005

OTHER PUBLICATIONS

International Search Report issued in corresponding International application No. PCT/EP2011/065692, date of mailing Nov. 16, 2011.
(Continued)

*Primary Examiner* — Matthew Nguyen
(74) *Attorney, Agent, or Firm* — Patent Portfolio Builders PLLC

(57) ABSTRACT

The invention relates to a switched-mode power supply delivering a first ($V_{POS}$) and a second ($V_{NEG}$) voltage which are symmetrical. It comprises a power stage (30) comprising an inductor (L), and switches (A, B, C, D, E) controlled by control signals. It also comprises a control circuit (34), coupled to the power stage (30), that is able to produce error signals (Verr1, Verr2) as a function of the difference between a reference voltage (Vref) and the first ($V_{POS}$) and second ($V_{NEG}$) voltages. The power supply comprises a synchronization circuit (38), coupled to the power stage (30) and to the control circuit (34), for generating the control signals in a manner that applies a control strategy adapted to minimize error signals, maintain a non-zero amount of energy in the inductor (L), and maintain the absolute value of the first ($V_{POS}$) and second ($V_{NEG}$) voltages at substantially equal values.

10 Claims, 5 Drawing Sheets

(51) Int. Cl.
*H02M 3/158* (2006.01)
*H02M 1/00* (2006.01)

(56) References Cited

U.S. PATENT DOCUMENTS

2009/0195267 A1 8/2009 Ho et al.
2012/0249197 A1* 10/2012 Rehm ............................ 327/156
2014/0002053 A1* 1/2014 Wang et al. ................... 323/351

OTHER PUBLICATIONS

Written Opinion of the International Searching Authority issued in corresponding International application No. PCT/EP2011/065692, date of mailing Nov. 16, 2011.

* cited by examiner

SYMMETRICAL OUTPUT SWITCH-MODE POWER SUPPLY

TECHNICAL FIELD

The invention relates to switched-mode power supplies and regulators for generating and regulating a direct current. It more particularly relates to symmetrical power supplies suitable for powering an audio amplifier. Such power supplies can be embedded in an autonomously-powered mobile device, such as a portable music player or a mobile telephone.

TECHNOLOGICAL BACKGROUND

Mobile devices have limited electrical resources. The energy output of the power sources used to furnish a regulated DC voltage, from a direct current provided by embedded batteries, is a determining factor in the length of time the device remains charged. It is desirable to increase this length of time. To allow a headset connected to a mobile device to reproduce sounds from audio data, an electrical signal amplified by an audio amplifier must be produced. The audio amplifier must therefore be supplied with sufficient power to produce at least one regulated and substantially constant voltage, ideally a positive voltage and a negative voltage that are symmetrical, typically 1.8V and −1.8V or even 0.8V and −0.8V.

One known approach for powering an audio amplifier consists of using a switched-mode power supply to provide a positive voltage to the audio amplifier and to a charge pump. From the positive voltage, the charge pump generates a negative voltage delivered to the audio amplifier. This type of setup only enables an efficiency of about 75%. The energy losses observed in the charge pump are the primary cause: in the case of a symmetrical positive voltage and negative voltage of 1.8V and −1.8V respectively, measurements show that about 400 mV are lost in the charge pump. The charge pump must therefore be supplied with a voltage of 2.2 V, which results for example in significant dissipation of energy in a linear audio amplifier for which the efficiency is about 30%. Also, in a conventional terminal comprising a battery of a capacity of between 700 and 1000 mA/H, such a setup results in a playing time of only 30 to 70 hours, depending on the nature of the audio data. In addition, such a setup typically requires the use of five condensers, an inductor, and connections occupying a silicon surface area of 0.42 mm$^2$, in the case of a circuit etched using 130 nm technology.

BRIEF SUMMARY OF THE INVENTION

A need therefore exists for a power supply that generates at least two symmetrical regulated DC voltages from a DC voltage source, and has an efficiency of above 75%, occupying a contained silicon surface area, typically about 0.5 mm$^2$ in the case of a circuit etched with 130 nm technology, and using a minimum of external passive components. Such an arrangement would allow a conventional device comprising a battery of a capacity of 700 to 1000 mA/H to offer a playing time of about 100 hours. In addition, the cost price of such a device would be reduced, requiring less silicon, fewer external components, and a smaller surface area for the printed circuit, than a conventional device.

A first aspect of the invention proposes a voltage regulating device comprising a power stage, and a control circuit which allows synchronizing and managing the power switches in order to apply a given control strategy.

The power stage comprises an inductor between a first node and a second node, a first switch between the first node and a power supply node for which the potential is non-zero and of constant polarity; a first capacitor between a node at a reference potential and a second switch coupled to the first node; a second capacitor between a node at the reference potential and a third switch coupled to the second node; a fourth switch between the second node and a node at the reference potential; a fifth switch between the first node and a node at the reference potential; a first output for delivering a first voltage corresponding to the voltage at the terminals of the first capacitor; a second output for delivering a second voltage corresponding to the voltage at the terminals of the second capacitor; with the power stage able to adopt one of the following configurations as a function of the control signals: a first configuration in which only the first and the third switches are closed; a second configuration in which only the first and the fourth switches are closed; a third configuration in which only the second and the fourth switches are closed; a fourth configuration in which only the third and the fifth switches are closed.

The control circuit, which is coupled to the power stage, is able to produce error signals as a function of the difference between the reference potential and the first and second voltages, and to generate the control signals.

Further, the control circuit comprises a first subtractor able to calculate a first comparison signal representing the result of the difference between the first voltage and the second voltage. The control signal comprises further a second subtractor able to calculate a second comparison signal representing the result of the sum of the second voltage and the first voltage.

The regulating device as defined above yields an energy efficiency of at least 80%, in particular because of the control strategy limiting the amount of energy in the inductor and the use of four configurations. The use of a single inductor minimizes the number of passive components required, and therefore limits the surface area of the printed circuit. In addition, the use of only two capacitors reduces the silicon surface area occupied by such a device, to substantially 0.5 mm$^2$ in the case of a circuit etched with 130 nm technology.

The control strategy may be adapted to minimize error signals, maintain a non-zero amount of energy in the inductor, and maintain the absolute value of the first and second voltages at substantially equal values.

The synchronization circuit is also simple to implement because only four configurations, achieved by the use of five switches, are necessary to control the power stage.

In particular, the synchronization circuit can be configured to generate control signals corresponding to the following sequences of configurations:
  the first configuration, followed by the third configuration, if it is necessary to provide as much energy to adjust the first voltage as to adjust the second voltage in order to apply the control strategy;
  the first configuration, followed by the fourth configuration, followed by the third configuration, if it is necessary to provide more energy to adjust the second voltage relative to the first voltage in order to apply the control strategy;
  the first configuration, followed by the second configuration, followed by the third configuration, if it is necessary to provide more energy to adjust the fist voltage relative to the second voltage in order to apply the control strategy;
  the first configuration, followed by the fourth configuration, if it is only necessary to provide energy to modify or maintain the value of the second voltage in order to apply the control strategy; and, the second configuration, followed by the third configuration, if it is only necessary to provide the energy to modify or maintain the value of the first voltage in order to apply the control strategy.

In one embodiment, the first error signal may be generated by a first error amplifier circuit able to amplify and filter the difference between the reference voltage and the fist comparison signal. The second error signal may further be generated by a second error amplifier circuit able to amplify and filter the difference between the reference voltage and the second comparison signal.

The synchronization circuit can be configured to generate the control signals by comparing the first error signal and the second error signal to a periodic signal, and producing one of the following configuration sequences at each period of the periodic signal:

the first configuration, followed by the second configuration, then the third configuration, if the second error signal is the first of the error signals to be less than the periodic signal during said period;

the first configuration, followed by the fourth configuration, followed by the third configuration, if the first error signal is the first of the error signals to be less than the periodic signal during said period;

the first configuration, followed by the fourth configuration, if, in order to apply the control strategy, it is necessary to provide energy to modify or maintain the value of the second voltage only;

the second configuration, followed by the third configuration, if, in order to apply the control strategy, it is necessary to provide energy to modify or maintain the value of the first voltage only; and the first configuration, followed by the third configuration, if, in order to apply the control strategy, it is necessary to provide sufficient energy to adjust the first voltage and the second voltage.

The above four configurations can be defined in the following manner, enabling simple management of the power switches:

the first configuration extends over a period of time during which both the first error signal and the second error signal are greater than the periodic signal;

the second configuration extends over a period beginning when the first error signal becomes less than the periodic signal, and ending when the first error signal becomes less than the periodic signal;

the third configuration extends over a period of time during which both the first error signal and the second error signal are less than the periodic signal;

the fourth configuration extends over a period of time beginning when the first error signal becomes less than the periodic signal, and ending when the second error signal becomes less than the periodic signal.

In particular, the power stage is in the second configuration during a period beginning at the moment when the second error signal becomes less than the periodic signal, and ending at the moment when the first error signal becomes less than the periodic signal. The power stage is in the fourth configuration during a period starting at the moment when the first error signal becomes less than the periodic signal, and ending at the moment when the second error signal becomes less than the periodic signal.

A second aspect of the invention proposes a power supply comprising a device according to the first aspect described above.

Lastly, a third aspect proposes a mobile device having a power supply according to the second aspect. In particular, the mobile device can comprise an audio amplifier coupled to the power supply.

In one embodiment, the mobile device comprises a processor, an audio amplifier, a digital-to-analog converter, and a processing unit for processing digital audio data and able to deliver a digital audio data stream to the digital-to-analog converter. The digital-to-analog converter is able to convert the digital audio data stream into an analog audio signal. The audio amplifier is coupled to the digital-to-analog converter so as to amplify the analog audio signal. The power supply can also be coupled to the digital-to-analog converter to provide power to the digital-to-analog converter.

BRIEF DESCRIPTION OF DRAWINGS

Other features and advantages of the invention will become apparent from the following description. This description is purely illustrative and is to be read with reference to the attached drawings, in which.

DETAILED DESCRIPTION OF EMBODIMENTS

Figure 1:
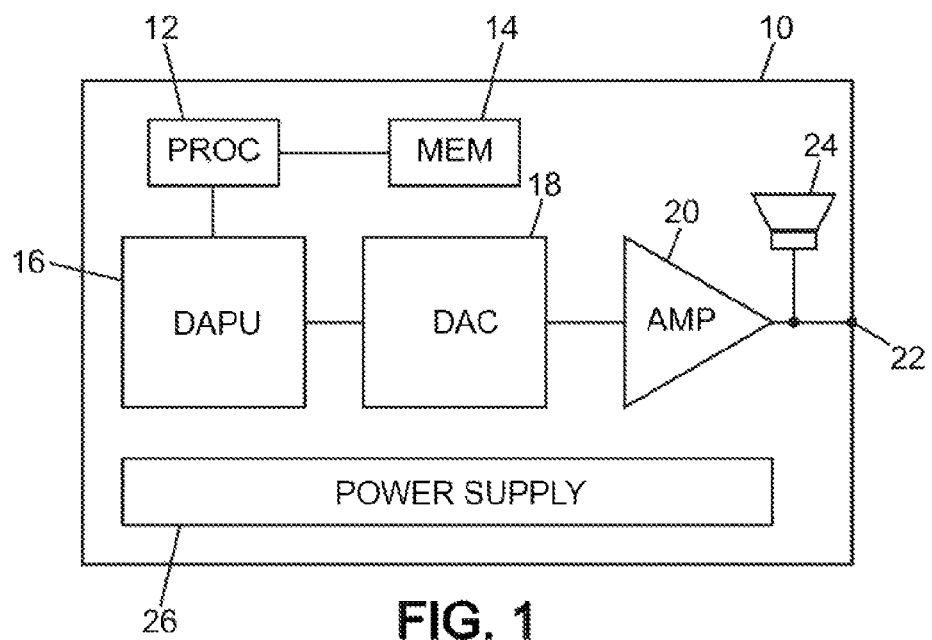
FIG. 1 is a schematic diagram of a mobile device adapted to reproduce sound from audio data.

The following sections discuss, for illustrative purposes only and as represented in FIG. 1, an example of a mobile device 10 comprising a processor 12 coupled to storage 14, typically a rewritable solid-state drive assembly, and random access memory. The mobile device 10 comprises a digital audio data processing unit 16, able to read, decode, and apply audio processing to audio data and in particular to audio data stored in the storage. The digital audio data processing unit outputs a stream of digital audio data. The mobile device 10 comprises a digital-to-analog converter 18 for converting the stream of digital audio data into an analog audio signal. The analog audio signal is amplified by an audio amplifier 20 delivering an amplified audio signal to an internal sound reproduction system 24 and/or an audio output 22 able to be coupled to an external sound reproduction device.

As a non-limiting example, the mobile device 10 can be a mobile telephone, in which the audio output 22 is a female headset jack connector. The sound reproduction device 24 can, for example, be an audio headset or an external speaker.

The mobile device 10 comprises a power supply 26 for powering the components of said device 10, particularly the amplifier 20, and optionally the digital-to-analog converter 18. The power supply 26 is a symmetrical switched-mode power supply comprising a positive output and a negative output, for example respectively delivering a DC voltage of 1.8V and −1.8V. Thus the amplifier 20 receives a DC voltage of 1.8V on one input, and a DC voltage of −1.8V on another input.

In the present description, for illustrative purposes only, the architecture of the mobile device 10 is based on there being separate units for the processor 12, the digital audio processing unit 16, and the digital-to-analog converter 18. However, the present embodiment applies just as easily to any other architecture of the mobile device 10; no limitation is placed on this aspect. The invention can be applied to a single-chip architecture in which the processor 12 and the digital audio processing unit 16 are comprised within a single entity.

Figure 2:
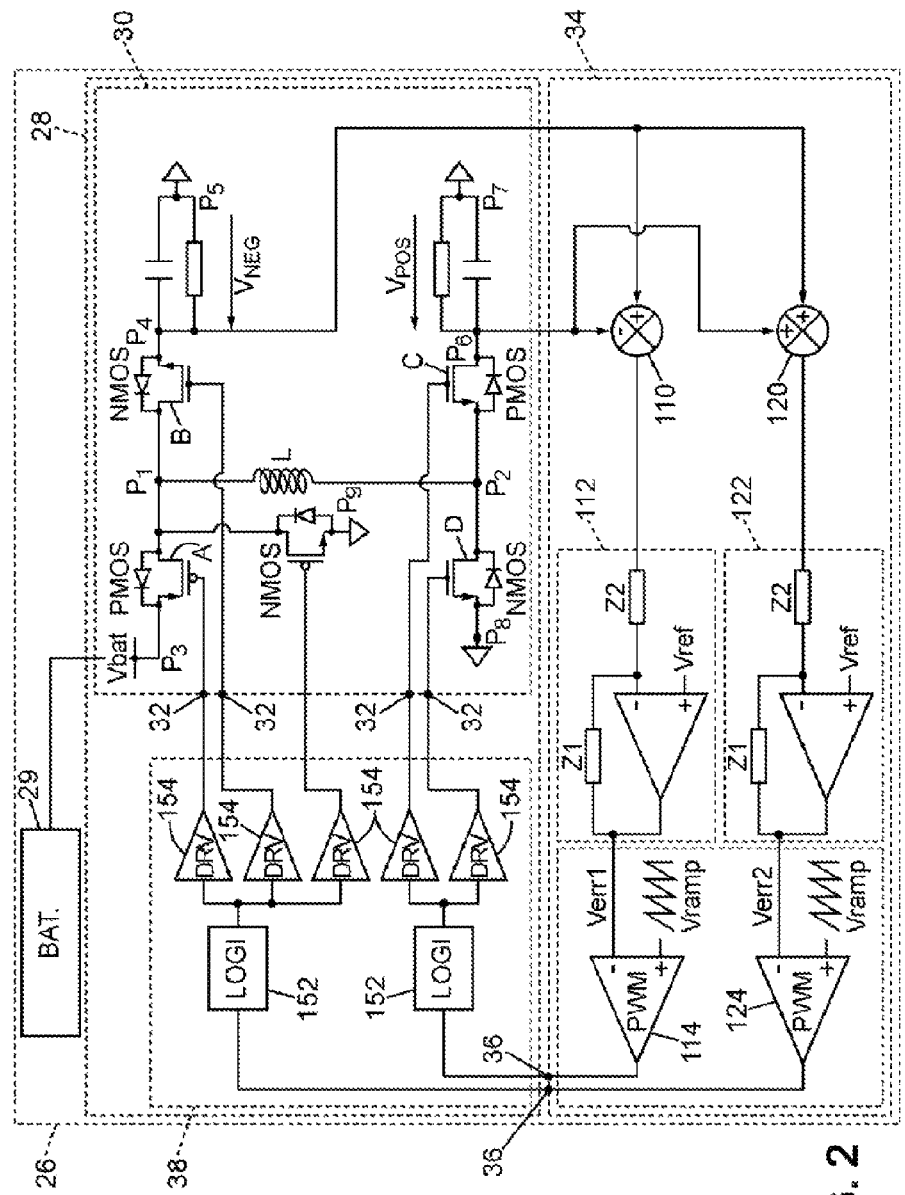
FIG. 2 is a functional diagram of an embodiment of a power supply.

FIG. 2 is a functional diagram of an embodiment of the power supply 26. The power supply 26 comprises a voltage regulating device 28 coupled to a voltage source 29, for example an electrical cell such as a battery.

The voltage regulating device 28 comprises a power stage 30 adapted to deliver a positive voltage $V_{POS}$ on a first output and a negative voltage $V_{NEG}$ on a second output, the absolute value of the positive voltage $V_{POS}$ being substantially equal to the absolute value of the negative voltage $V_{NEG}$. The power stage 30 is equipped with control inputs 32 for receiving control signals defining a control strategy for producing the negative voltage $V_{NEG}$ and the positive voltage $V_{POS}$. The voltage regulating device 28 comprises a control circuit 34 coupled to the first and second output from the power stage 30. In particular, the control circuit 34 allows comparing over time the negative $V_{NEG}$ and positive $V_{POS}$ voltages to a reference voltage $V_{REF}$ in order to produce error signals $V_{err1}$, $V_{err2}$ on the error signal outputs 36. The voltage regulating device 28 comprises a synchronization circuit 38, coupled to the error signal outputs 36 in order to generate control signals from the error signals $V_{err1}$, $V_{err2}$, and to the power stage 30 via the control inputs 32 in order to deliver the control signals thus generated.

The power stage 30, diagrammed in various configurations in FIGS. 3a, 3b, 3c and 3d, will now be described. It comprises a single inductor L coupled between a first node $P_1$ and a second node $P_2$. The use of a single inductor allows minimizing the surface area occupied by the power stage 30 compared to other circuits requiring multiple inductors, typically by an order of 20%. In fact, the use of inductors is costly in terms of surface area occupied in the printed circuit. A first controlled switch A is serially connected between the first node $P_1$ and a power supply node $P_3$ of non-zero potential $V_{bat}$ and constant polarity. The potential $V_{bat}$ is typically obtained by means of coupling the power supply node $P_3$ to the output from the voltage source 29. A second controlled switch B is serially connected between the first node $P_1$ and a fourth node $P_4$. A first capacitor $C_{neg}$ is serially connected between the fourth node $P_4$ and a reference potential node $P_5$, generally of zero potential. The voltage at the terminals of the first capacitor $C_{neg}$, meaning the voltage between the fourth node $P_4$ and the reference potential node $P_5$, is the negative voltage $V_{NEG}$. A third controlled switch C is serially connected between the second node $P_2$ and a sixth node $P_6$. A second capacitor $C_{pos}$ is serially connected between the sixth node $P_6$ and a reference potential node $P_7$ generally of zero potential. The voltage at the terminals of the second capacitor $C_{pos}$, meaning the voltage between the sixth node $P_6$ and the reference potential node $P_7$, is the positive voltage $V_{POS}$. A fourth controlled switch D is serially connected between the second node $P_2$ and a reference potential node $P_6$ generally of zero potential. A fifth controlled switch E is serially connected between the first node $P_1$ and a reference potential node $P_9$ of generally zero potential zero. Note that the reference potential nodes $P_5$, $P_7$, $P_8$ and $P_9$ are at the same potential.

The power stage 30 can assume four configurations, depending on the open or closed state of the controlled switches A, B, C, D and E.

Figure 3A:
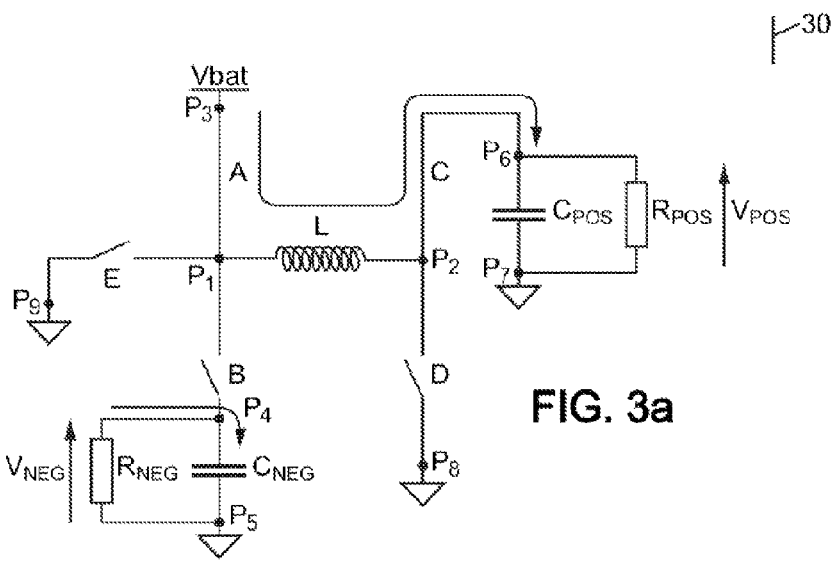
FIGS. 3a, 3b, 3c and 3d are functional diagrams illustrating the different configurations of a power stage of the power supply.

In a first configuration $C_1$, represented in FIG. 3a, the controlled switches A and C are closed while the switches B, D and E are open, allowing the inductor L and the second capacitor $C_{pos}$ to charge.

Figure 3B:
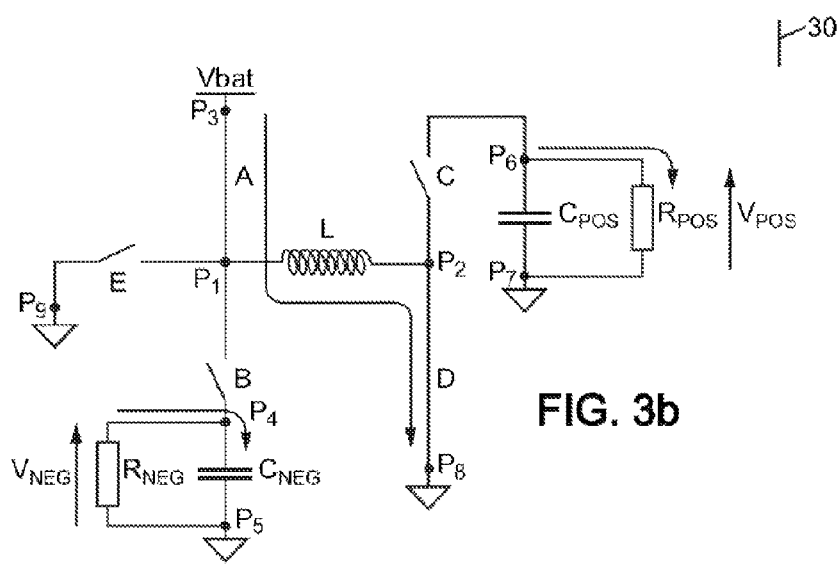

In a second configuration $C_2$, represented in FIG. 3b, the switches A and D are closed while the switches B, C and E are open, allowing the inductor L to charge.

Figure 3C:
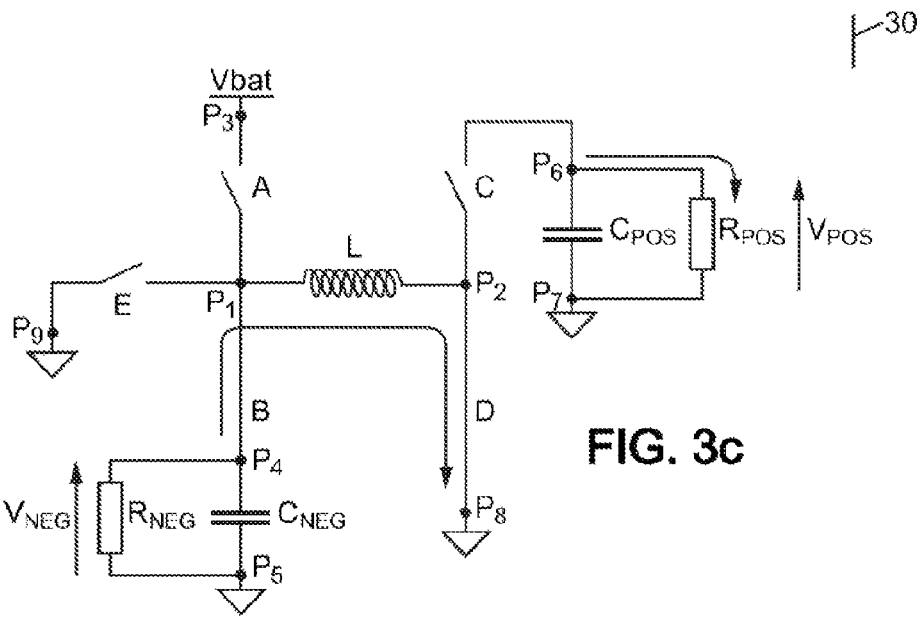

In a third configuration $C_3$, represented in FIG. 3c, the switches B and D are closed while the switches A, C and E are open, allowing the inductor L and the first capacitor $C_{neg}$ to discharge.

Figure 3D:
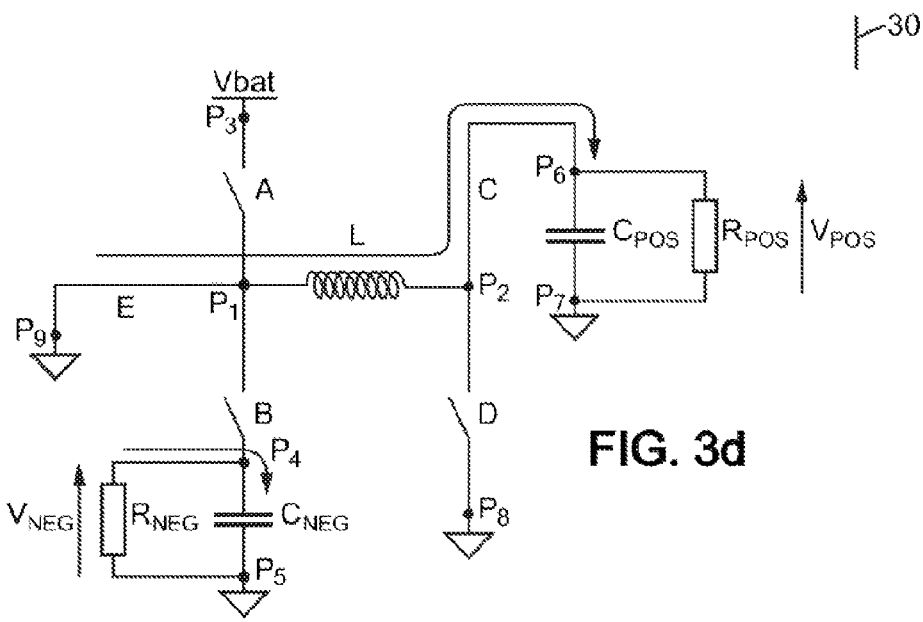

In a fourth configuration $C_4$, represented in FIG. 3d, the switches E and C are closed while the switches A, B and D are open, allowing the inductor L to discharge and the first capacitor $C_{neg}$ to charge.

In the embodiment of the voltage regulating device 28 represented in FIG. 2, the control circuit 34 comprises a first subtractor 110 able to calculate a first comparison signal representing the difference in potential between the fourth node $P_4$ and the sixth node $P_6$, or in other words representing the result of subtracting the positive voltage $V_{pos}$ from the negative voltage $V_{neg}$. The output from the first subtractor 110 is coupled to a first differential amplifier circuit 112 configured to generate the first error signal $V_{err1}$ representing the difference between a reference potential $V_{ref}$ and the first amplified then filtered comparison signal. The control circuit 34 can comprise a first pulse-width modulator 114 for modulating the first error signal $V_{err1}$ as a function of a ramp signal, for example a periodic substantially triangular voltage signal. The first error signal $V_{err1}$, possibly modulated, is delivered to the error signal outputs 36.

The control circuit 34 comprises a second subtractor 120 adapted to calculate a second comparison signal representing the sum of the potential between the fourth node $P_4$ and the sixth node $P_6$, or in other words representing the result of adding the positive voltage $V_{pos}$ and the negative voltage $V_{neg}$. The output from the second subtractor 120 is coupled to a second differential amplifier circuit 122 configured to generate the second error signal $V_{err2}$ representing the difference between the reference potential $V_{ref}$ and the second amplified then filtered comparison signal. The control circuit 34 can comprise a second pulse-width modulator 124 for modulating the second error signal $V_{err2}$ as a function of a ramp signal, for example a periodic substantially triangular voltage signal. The second error signal $V_{err2}$, possibly modulated, is delivered to the error signal outputs 36.

From the first error signal $V_{err1}$ and the second error signal $V_{err2}$, the synchronization circuit 38 controls, with the aid of control means 154, the opening or closing of the controlled switches A, B, C, D and E of the power stage 30 such that the latter is in one of the four configurations $C_1$, $C_2$, $C_3$, and $C_4$ depending on the control strategy, followed by logic units 152 coupled to the control circuit 34 and to the control means 154. The control strategy aims to:

minimize the energy accumulated in the inductor L; and
generate the positive voltage $V_{POS}$ and the negative voltage $V_{NEG}$, no matter what output current is used by a circuit supplied with the positive voltage $V_{POS}$ and the negative voltage $V_{NEG}$.

The control strategy also aims to maintain a non-zero amount of energy in the inductor L, such that the power stage 30 is in a continuous current mode. The control strategy leads to maintaining the absolute value of the positive voltage $V_{pos}$ and the absolute value of the negative voltage $V_{neg}$ at substantially equal values. The control strategy is defined to minimize the number of transitions between the configurations $C_1$, $C_2$, $C_3$ and $C_4$, and the duration of the time periods during which the power stage 30 is in configuration $C_2$. Such a strategy limits the current in the inductor and increases the general energy efficiency of the power supply 26.

In particular, the control strategy can comprise the following configuration sequences:

configuration $C_1$, followed by configuration $C_3$, if it is necessary to provide sufficient energy to modify or maintain the value of the positive voltage $V_{pos}$ and the value of the negative voltage $V_{neg}$;

configuration $C_1$, followed by configuration $C_4$, followed by configuration $C_3$, if it is necessary to provide more energy in order to modify or maintain the value of the positive voltage $V_{pos}$ relative to the value of the negative voltage $V_{neg}$;

configuration $C_1$, followed by configuration $C_2$, followed by configuration $C_3$, if it is necessary to provide more energy in order to modify or maintain the value of the negative voltage $V_{neg}$ relative to the value of the positive voltage $V_{pos}$;

configuration $C_1$, followed by configuration $C_4$, if it is necessary to provide only the energy to modify or maintain the value of the positive voltage $V_{POS}$;

configuration $C_2$, followed by configuration $C_3$, if it is necessary to provide only the energy to modify or maintain the value of the negative voltage $V_{NEG}$.

Figure 4:
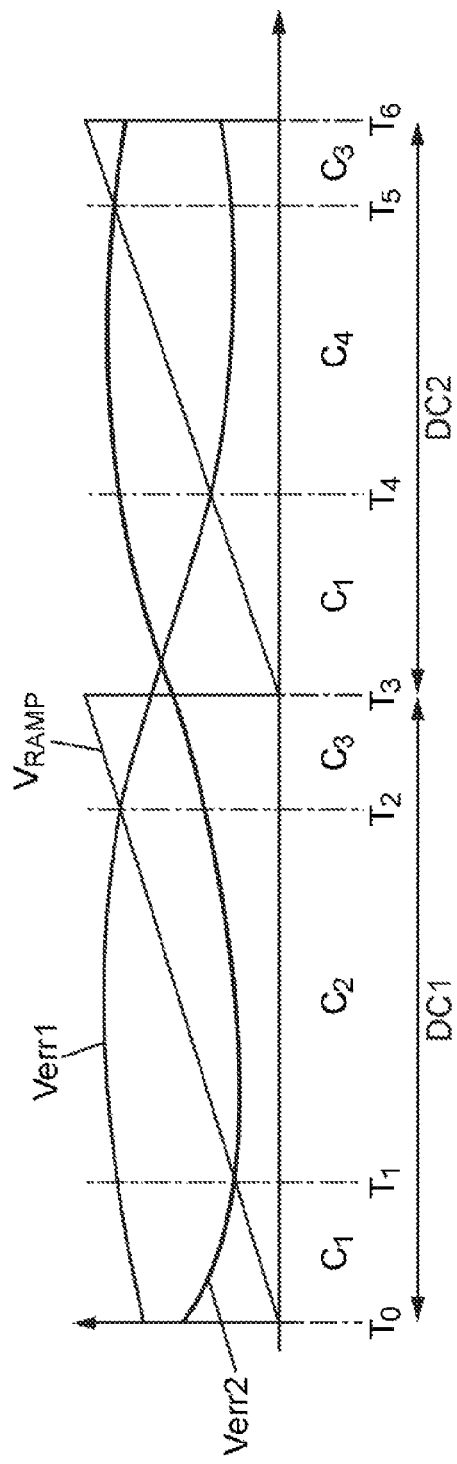
FIG. 4 is a timing diagram representing an example application of the control strategy for the power supply's synchronization circuit.

One example of applying the control strategy for the synchronization circuit 38 is illustrated in FIG. 4. The timing diagram represents the change over time in the voltage of the first error signal $V_{err1}$, the second error signal $V_{err2}$, and a triangular signal $V_{RAMP}$.

During a first period beginning at time $T_0$, the first error signal $V_{err1}$ and the second error signal $V_{err2}$ have a voltage greater than that of the triangular signal $V_{RAMP}$. The configuration $C_1$ is therefore selected. The first period ends at time $T_1$ where the second error signal $V_{err2}$ has a voltage less than that of the triangular signal $V_{RAMP}$. A second period then begins at time $T_1$, during which configuration $C_2$ is chosen. The second period ends at time $T_2$ where the first error signal $V_{err1}$ has a voltage less than that of the triangular signal $V_{RAMP}$. A third period then begins at time $T_2$ during which configuration $C_3$ is chosen. The third period ends at time $T_3$ where the first error signal $V_{err1}$ and the second error signal $V_{err2}$ have a voltage greater than that of the triangular signal $V_{RAMP}$. The period between the time $T_0$ and the time $T_3$ corresponds to a period of the triangular signal $V_{RAMP}$.

During a fourth period beginning at time $T_3$, the first error signal $V_{err1}$ and the second error signal $V_{err2}$ have a voltage greater than that of the triangular signal $V_{RAMP}$. The configuration $C_1$ is therefore selected. The fourth period ends at time $T_4$ where the first error signal $V_{err1}$ has a voltage less than that of the triangular signal $V_{RAMP}$. A fifth period then begins at time $T_4$ during which the configuration $C_4$ is selected. The fifth period ends at time $T_5$ where the second error signal $V_{err2}$ has a voltage less than that of the triangular signal $V_{RAMP}$. A sixth period then begins at time $T_5$, during which configuration $C_3$ is chosen. The sixth period ends at time $T_6$ where the first error signal $V_{err1}$ and the second error signal $V_{err2}$ have a voltage greater than that of the triangular signal $V_{RAMP}$. The period between the time $T_3$ and the time $T_6$ corresponds to a period of the triangular signal $V_{RAMP}$.

The invention claimed is:

1. A voltage regulating device comprising
a power stage comprising an inductor between a first node and a second node; a first switch between the first node and a power supply node for which the potential is non-zero and of constant polarity; a first capacitor between a node at a reference potential and a second switch coupled to the first node; a second capacitor between a node at the reference potential and a third switch coupled to the second node; a fourth switch between the second node and a node at the reference potential; a fifth switch between the first node and a node at the reference potential; a first output for delivering a first voltage corresponding to the voltage at the terminals of the first capacitor; a second output for delivering a second voltage corresponding to the voltage at the terminals of the second capacitor; the power stage being arranged to adopt one of the following configurations as a function of the control signals: a first configuration in which only the first and the third switches are closed; a second configuration in which only the first and the fourth switches are closed; a third configuration in which only the second and the fourth switches are closed; a fourth configuration in which only the third and the fifth switches are closed; and a control circuit for synchronizing and controlling the switches in order to apply a given control strategy, the control circuit being coupled to the power stage and being able to produce error signals as a function of the difference between the reference potential and the first and second voltages, and to generate the control signals, wherein the control circuit comprises a first subtractor able to calculate a first comparison signal representing the result of the difference between the first voltage and the second voltage; said control circuit comprising a second subtractor arranged to calculate a second comparison signal representing the result of the sum of the second voltage and the first voltage.

2. A device according to claim 1 wherein the control strategy is adapted to minimize error signals, maintain a non-zero amount of energy in the inductor, and maintain the absolute value of the first and second voltages at substantially equal values.

3. A device according to claim 1, wherein the control circuit for synchronizing and controlling the switches is configured to generate the control signals corresponding to the following sequences of configurations:

the first configuration, followed by the third configuration, if it is necessary to provide as much energy to adjust the first as to adjust the second voltage in order to apply the control strategy;

the first configuration, followed by the fourth configuration, followed by the third configuration, if it is necessary to provide more energy to adjust the second voltage relative to the first voltage in order to apply the control strategy;

the first configuration, followed by the second configuration, followed by the third configuration, if it is necessary to provide more energy to adjust the first voltage relative to the second in order to apply the control strategy;

the first configuration, followed by the fourth configuration, if it is only necessary to provide energy to modify or maintain the value of the second voltage in order to apply the control strategy; and the second configuration, followed by the third configuration, if it is only necessary to provide the energy to modify or maintain the value of the first voltage in order to apply the control strategy.

4. A device according to claim 1, wherein the first error signal is generated by a first differential amplifier circuit arranged to compare a first reference voltage and the first comparison signal; and the second error signal is generated by a second differential amplifier circuit arranged to compare a second reference voltage and the second comparison signal.

5. A device according to claim 1, wherein the synchronization circuit is configured to generate the control signals by comparing the first error signal and the second error signal to a periodic signal, and producing one of the following configuration sequences at each period of the periodic signal:

the first configuration, followed by the second configuration, then the third configuration, if the second error signal is the first of the error signals to be less than the periodic signal during said period;

the first configuration, followed by the fourth configuration, followed by the third configuration, if the first error signal is the first of the error signals to be less than the periodic signal during said period;

the first configuration, followed by the fourth configuration, if, in order to apply the control strategy, it is necessary to provide energy to modify or maintain the value of the second voltage only;

the second configuration, followed by the third configuration, if, in order to apply the control strategy, it is necessary to provide energy to modify or maintain the value of the first voltage only; and the first configuration, followed by the third configuration, if, in order to apply the control strategy, it is necessary to provide sufficient energy to adjust the first voltage and the second voltage.

6. A device according to claim 5, wherein:

the first configuration extends over a period of time during which both the first error signal and the second error signal are greater than the periodic signal;

the second configuration extends over a period beginning at the moment when the second error signal becomes less than the periodic signal, and ending at the moment when the first error signal becomes less than the periodic signal;

the third configuration extends over a period of time during which both the first error signal and the second error signal are less than the periodic signal;

the fourth configuration extends over a period of time beginning at the moment when the first error signal becomes less than the periodic signal, and ending at the moment when the second error signal becomes less than the periodic signal.

7. A power supply comprising a device according to claim 1, coupled to a voltage source.

8. A mobile device having a power supply according to claim 7, comprising an audio amplifier coupled to said power supply.

9. A mobile device according to claim 8, comprising a processor, an audio amplifier, a digital-to-analog converter, and a digital audio data processing unit able to deliver a digital audio data stream to the digital-to-analog converter, with the digital-to-analog converter being able to convert the digital audio data stream into an analog signal, the audio amplifier being coupled to the digital-to-analog converter so as to amplify the analog audio signal.

10. A mobile device according to claim 9, wherein the power supply is coupled to the digital-to-analog converter in order to provide power to the digital-to-analog converter.

* * * * *